United States Patent

[11] 3,567,000

[72] Inventor  Elmer A. Richards
              Kalamazoo, Mich.
[21] Appl. No  842,592
[22] Filed    July 17, 1969
[45] Patented Mar. 2, 1971
[73] Assignee Caterpillar Tractor Co.
              Peoria, Ill.

[54] OVERRUNNING CLUTCH COUPLING
     8 Claims, 5 Drawing Figs.
[52] U.S. Cl................................................. 192/47,
                                        192/70.15, 192/94
[51] Int. Cl................................................. F16d 13/24
[50] Field of Search.......................................... 192/70.15,
                                                              94, 47

[56]            References Cited
           UNITED STATES PATENTS
834,574  10/1906  Haynes................  192/94(X)
852,587   5/1907  Towler.................. 192/94(X)
942,056  12/1909  Cumfer................. 192/70.15
1,009,836 11/1911 Fowler................. 192/94(X)
2,184,506 12/1939 Eason.................. 192/70.15(X)
2,339,643  1/1944 Tourneau.............. 192/70.15

Primary Examiner — Allan D. Herrmann
Attorney — Fryer, Tjensvold, Feix, Phillips and Lempio ABSTRACT: A clutch coupling for transmitting torque between a power shaft and a drive shaft comprising a pair of cone clutch plates mounted on helical splines on the power shaft to cooperate with a coaxial clutch cup which is axially movable relative to a flange on the drive shaft. The drive shaft is engaged with the clutch cup in a rotational drive relationship. A blocker mechanism serves to maintain the clutch cones in light contact with the cup, thereby allowing the cone plates to act upon the cup and transmit torque in either a clockwise or counterclockwise direction. Collapsing the blocker mechanism by pressurization of a fluid motor will allow torque to be transmitted in one direction only.

PATENTED MAR 2 1971

INVENTOR
ELMER A. RICHARDS

BY
Fryer, Tjensvold, Feix, Phillips & Lempio
ATTORNEYS

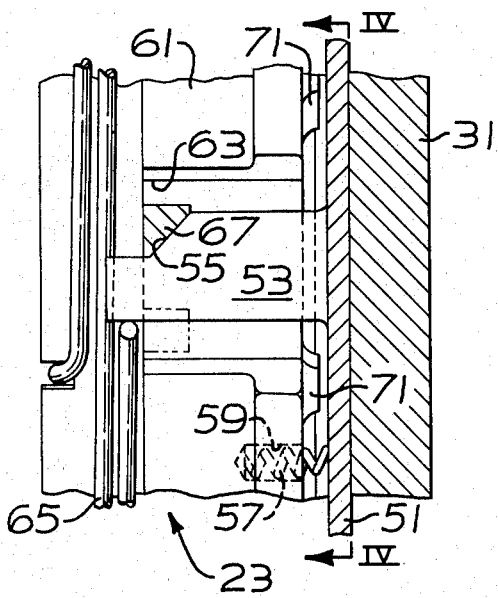
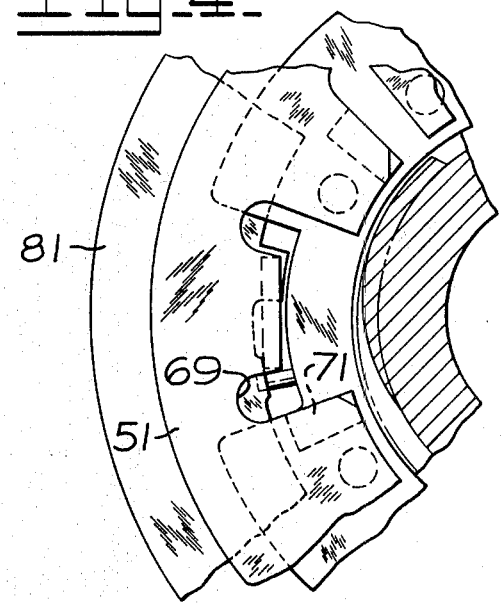
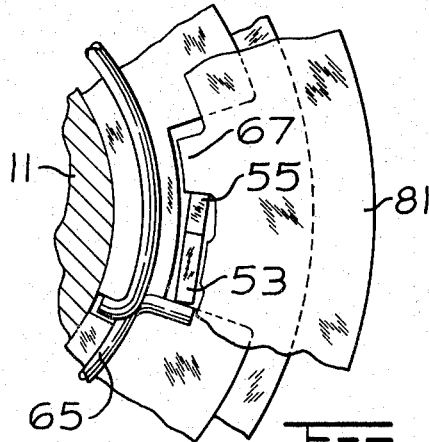
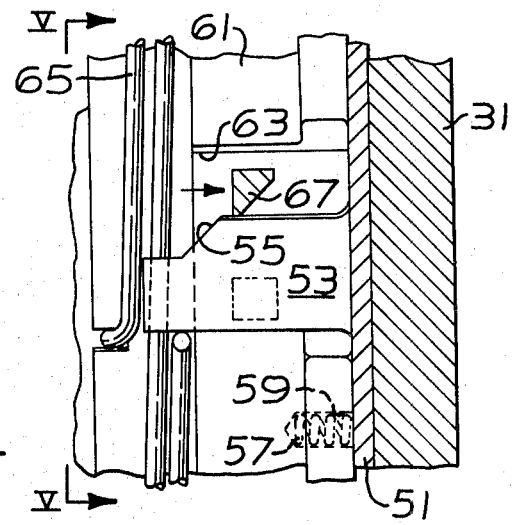

OVERRUNNING CLUTCH COUPLING

BACKGROUND AND SUMMARY OF THE INVENTION

This invention relates to an overrunning clutch assembly and, more particularly, to such an assembly which may be utilized on the output end of a transmission such as that disclosed in U.S. Pat. application Ser. No. 700,602, filed Jan. 25, 1968, now U.S. Pat. No. 3,508,450, entitled "Transmission With Uninterrupted Drive." That transmission, and any transmission of the stop-and-go type, requires a means for decoupling the drive line from the gear change output in order to be able to bring all rotating members in the transmission to a full stop. When the full stop occurs, the gear change may then be made with no clashing of gear coupler teeth. On the other hand, if this complete synchronization does not occur, wear on the component parts is rapid and the operation cycles are slow and/or uncoordinated.

In the past, complex mechanisms for synchronizing the gears of the transmission have been devised and power shift transmissions have been developed which incorporate several planetary sets and disc-type clutches. Nearly all of these have proven to be mechanically complex and, as a result, expensive to manufacture and maintain.

This invention provides a simple, inexpensive drive line decoupler which may be coordinated with the speed change control. A smooth decoupling action can be accomplished through the use of existing rotational forces and positive friction surfaces. Further, the invention provides a device which allows overrunning and retarding in the forward direction of drive and retarding in the reverse direction, while requiring only a limited amount of space.

The assembly of the present invention carries the required torque load on relatively small, easily machined parts. A helical spline on the power shaft allows the use of a cone and cup engagement which is complementary to a coupling and decoupling operation. A collapsible coupler or blocker serves as a variable axial spacer for the cone clutch, the plates of which move on the helical spline, thereby allowing critical speed sensing and alignment in all moving parts.

This invention, together with its further objects, advantages, modes, and embodiments, will become obvious to those skilled in the art by reference to the detailed description and accompanying drawings which illustrate what is presently considered to be the preferred embodiment of the best mode contemplated for utilizing the novel principles set forth in the claims.

BRIEF DESCRIPTION OF THE DRAWINGS

FIG. 2 is an enlarged, sectional illustration of the collapsible blocker in the extended position;

FIG. 3 is a view similar to FIG. 2, but with the blocker in the collapsed position;

FIG. 4 is a view of the blocker taken along the line IV—IV of FIG. 2; and

FIG. 5 is a view of the blocker taken along the line V—V of FIG. 3.

DETAILED DESCRIPTION

Figure 1:
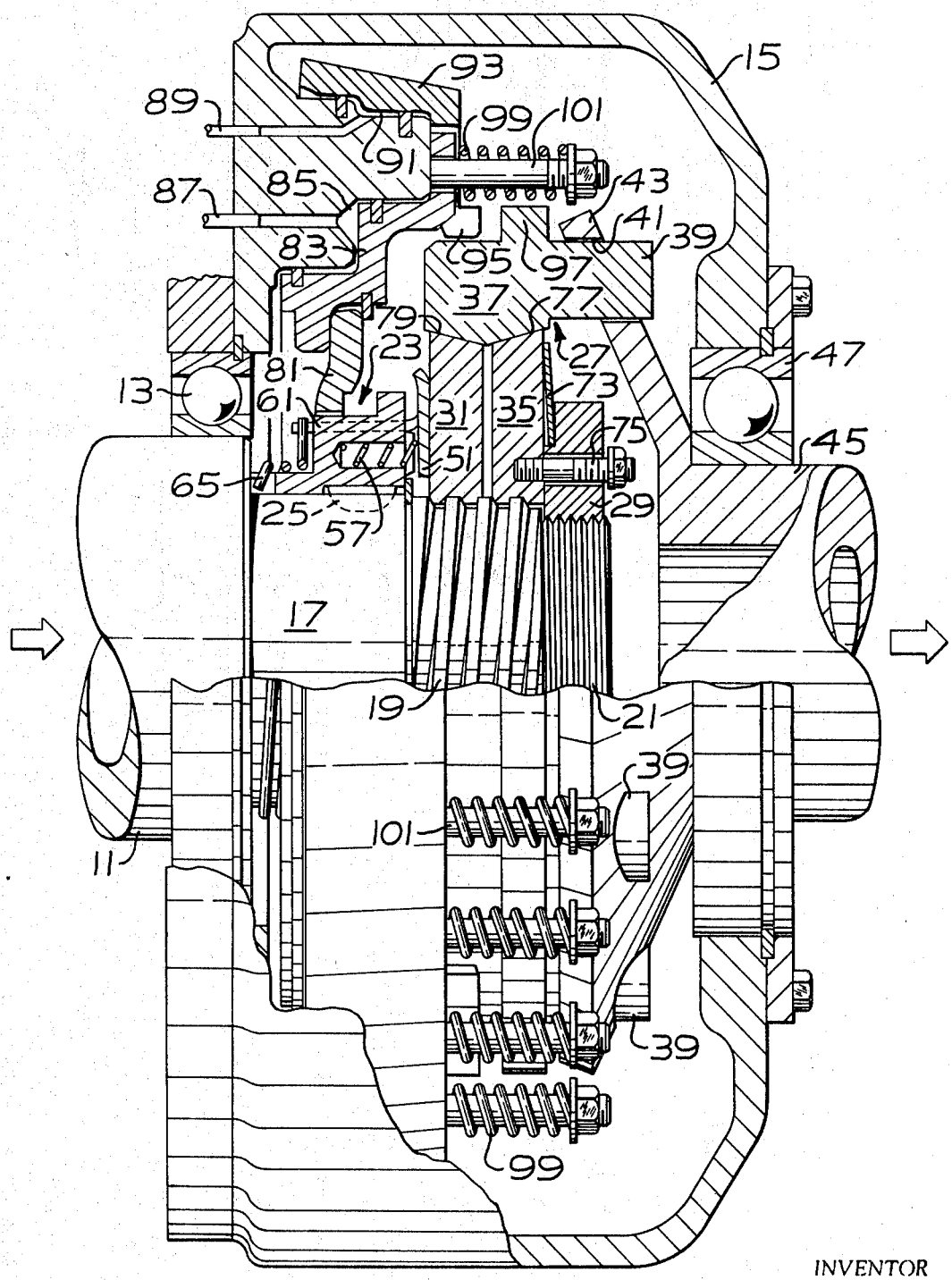
FIG. 1 is an axial view, partly in section, of the overrunning clutch coupling of the present invention.

Referring now to the drawings in greater detail, there is shown in FIG. 1 a power shaft 11 supported by a bearing 13 at its entry to a clutch body or housing 15. Within the body, the shaft terminates in a reduced portion 17, a helically splined section 19, and a threaded section 21. A collapsible coupler or blocker 23 is mounted for axial movement on the reduced portion 17 and is fixed so as to rotate therewith by a key 25. An opposed cone-type clutch 27 is mounted on helically splined portion 19, and a nut 29 is threadably fastened to the shaft on the threaded portion 21.

The opposing cone-type clutch 27 comprises a left cone plate 31 and a right cone plate 35 which serve to support and locate the coaxial clutch cup 37. A plurality of cylindrical members 39 on the clutch cup extend through a corresponding plurality of apertures 41 on a flange plate 43 which is integrally mounted on a drive shaft 45 supported at the housing wall by a bearing 47. The cylindrical members 39 serve to drive or be driven by the flange and shaft in rotational movement, but are relatively movable in the axial direction in a sliding relationship so that the flange plate 43 exerts no axial positioning force on the cup 37.

Referring now to FIG. 2, there is shown, in abutment with the left cone plate 31, a coupler ring 51 having a one or more tabs 53 extending axially therefrom, each of which has a cam surface 55 thereon. The coupler ring is held in abutment with the left cone plate by a plurality of springs 57 which are situated within a corresponding plurality of bores 59 in the body 61 of the blocker 23.

Each tab 53 extends into a slot 63 in the blocker body 61 and is biased in a counterclockwise direction, as viewed from the power shaft end of the housing 15, by a torsion spring 65.

When cams 67, corresponding in number to the number of tabs 53 and cooperating with cam surfaces 55, are actuated, by a means to be described later, from the position shown in FIG. 2 to that shown in FIG. 3, tab 53 and ring 51 are moved against the force of torsion spring 65, thereby aligning a plurality of apertures 69 in ring 51 to be axially aligned with a corresponding plurality of spacer lugs 71 on the blocker body 61. As will now be described, this allows the blocker assembly to be collapsed so that left cone plate 31 can move toward the left, as viewed in FIG. 1, by rotating on the spline 19.

On the opposite side of the clutch assembly 27, a Belleville spring 73 acts between the nut 29 and right cone plate 35 so as to tend to motivate plate 35 toward the left. The leftward movement of the cone plate is limited by a plurality of stop bolts, one of which is shown at 75. The biasing of plate 35 to the left causes it to engage with cup 37 at clutch surface 77, thereby biasing cup 37 to the left so that it enters into engagement with plate 31 at clutch surface 79. This, in turn, serves to bias cone plate 31 against the coupler ring 51 so that when the blocker is collapsed as previously described, the plate 31 and the ring 51 can move to the left a greater distance than can cone plate 35, which is limited by stop bolt 75. The friction engagement at surfaces 77 and 79 then becomes relatively light. The cams 67 which cause the collapse of the blocks, are integral with a plate 81 which rotates with the blocker and power shaft 11. The position of the cam plate 81 is controlled by forward fluid motor 83 which can be motivated by fluid entering a chamber 85 in response to a signal entering the clutch housing via a line 87. Thus, fluid in chamber 85 drives piston 83 toward the right, thereby moving cam plate 81 and cams 67 to the right, with a result which has been previously described relative to FIGS. 2 and 3, thereby allowing cup 37 to move to the left.

When the clutch cup 37 is to be actuated toward the right to provide torque drive to shaft 45 in the opposite direction, fluid entering a line 89 fills a chamber 91 so as to drive a reverse fluid motor 93 to the right. A plurality of extensions 95 on the reverse motor 93 act against a flangelike member 97 on the cup, moving the cup to the right against spring 73. When the fluid pressure is diminished in chamber 85 or chamber 91, the motors are biased toward the left by a series of springs 99 acting against a corresponding series of retention bolts 101 which are fixed to the clutch case 15.

The operation of the clutch will now be described with the understanding that forward motion of the vehicle is performed by a clockwise rotation of power shaft 11, as viewed from the left on FIG. 1. In the standard forward drive condition, cone plate 31 is urged into engagement with clutch cup 37 due to the movement of plate 31 on the splines 19. This movement is caused by the difference in friction exerted at cone surface 79 and that exerted at helical spline 19. The right plate 35 will also move to the right, due to its cooperation with spline 19, against the force of the Belleville spring 73, until the spring reaches its maximum deflection at the point of full abutment of the surfaces of plate 35, spring 73, and nut 29. At this time maximum friction will occur at the surfaces 77 and 79 so that the input torque of shaft 11 will be transmitted, via the cone plates 31 and 35, cup 37, and flange plate 43, to the drive shaft 45 at a synchronous, or equal speed of rotation, relationship.

When drive shaft 45 turns at a speed greater than that of power shaft 11, such as during overrunning or a shift transient, the greater rotational speed of shaft 45 transmitted through plate 43 and cup 37, will tend to rotate cone plates 31 and 35 clockwise relative to the shaft 11, thereby causing them to move to the left on helical spline 19.

At the same instant, a forward drive signal, from the transmission or other source, entering line 87 motivates the forward fluid motor 83 toward the right, thereby serving to motivate the coupler ring 81 from the position illustrated in FIG. 2 to the rotational position shown in FIG. 3. At this point, lugs 71 of blocker body 61 and apertures 69 in ring 51 will be axially aligned but the lugs 71 will not extend into the apertures 69.

Movement of plate 35 to the left in the overrunning condition will be limited by a stop 75. Movement of plate 31 will be limited only by the fully collapsed position of the blocker since the lugs 71 can extend into apertures 69 as plate 31 overcomes the force of springs 57. Although the forces acting to move plate 31 to the left and the forces tending to bias it toward the right will balance at some point less than the fully collapsed position of the blocker, plate 31 will be able to move further than plate 35, with proper design, thus diminishing the friction between the cone plates and the cup at surfaces 77 and 79 to basically only that friction produced by spring 57. When this has occurred, if desired, shaft 11 may be brought to a full stop so as to produce a zero speed synchronization of gears within the transmission.

When forward retarding is desired, no signal is delivered to chamber 85 and the blocker remains extended. In this case, the distance which plate 31 can move to the left is less than that which plate 35 can move to the left and full friction contact continues to take place at surfaces 77 and 79. Therefore, the vehicle inertia force entering the clutch from shaft 45 will drive the shaft 11 at a synchronous speed, thereby allowing retarding.

When shaft 11 is rotated in a counterclockwise, or reverse direction by the transmission, a suitable signal may enter line 89 so as to pressurize chamber 91, thereby driving piston 93, extension 95, flangelike portion 97 and cup 37 toward the right. This will allow springs 57 to move cone 31 and ring 51 to the right. When axial clearance is established, torsion spring 65 will rotate ring 51 counterclockwise to an abutting position. The counterclockwise rotation of shaft 11 will tend to motivate cone plates 31 and 35 toward the left on spline 19, thereby providing full friction at surfaces 77 and 79 since blocker 23 will be in the extended position. Thus, the counterclockwise rotational motion of shaft 11 will be transmitted through the clutch plate, the cup, and the flange plate to the output shaft 45.

With respect to reverse retarding, the retarding torque entering the clutch through shaft 45 will cause plates 31 and 35 to move to the left on helical spline 19, while maintaining the full frictional relationship at surfaces 77 and 79, thereby transmitting the retarding torque from shaft 45 to shaft 11.

Thus the applicant has provided an embodiment of a new and improved concept in the clutch art which yields a true advance in the art. Many further modifications and alterations will be obvious to those skilled in the art.

I claim:

1. A clutch assembly comprising:
   a power shaft;
   a blocker assembly on the power shaft;
   a helical spline on the power shaft adjacent the blocker assembly;
   a pair of clutch plates movably mounted on the helical spline;
   a clutch cup between and supported by the clutch plates;
   a drive shaft;
   means connecting the clutch cup to the drive shaft for transmitting rotational motion therebetween; and
   means in the blocker assembly and on the shaft tending to bias the clutch plates toward each other and the clutch cup.

2. The clutch assembly of claim 1 including means for motivating the clutch cup in response to a fluid signal.

3. The clutch assembly of claim 1 including means in the blocker assembly for allowing the blocker assembly to be collapsed.

4. The clutch assembly of claim 3 including means mounted relative to the blocker assembly for collapsing the blocker assembly.

5. A clutch assembly comprising:
   an input shaft;
   an output shaft;
   a helical spline on one of the shafts, a pair of clutch plates, movable relative to the one of the shafts and to each other, mounted on the helical spline:
   a clutch cup supported by the clutch plates;
   means connecting the clutch cup to the other of the shafts for transmission of rotational movement therebetween;
   means on the one shaft for limiting the relative movement of each clutch plate relative to the one shaft; and
   means in the movement-limiting means for variably limiting the distance one of the clutch plates can move.

6. The clutch assembly of claim 5 including means mounted in the clutch assembly for actuating the limiting means.

7. The clutch assembly of claim 6 including fluid motor means in the assembly for operating the actuating means.

8. The clutch assembly of claim 6 wherein the movement limiting means comprises:
   a coupler ring;
   first biasing means forcing the coupler ring into abutment with one of the clutch plates;
   second biasing means biasing the coupler ring in a rotational direction about the axis of the input shaft; and
   means on the coupler ring for causing rotation thereof against the force of the second biasing means when the actuating means is actuated.